United States Patent [19]

Vignos et al.

[11] Patent Number: 5,576,497
[45] Date of Patent: Nov. 19, 1996

[54] ADAPTIVE FILTERING FOR A VORTEX FLOWMETER

[75] Inventors: James H. Vignos, Needham Heights; M. Charles Cheney, Wrentham, both of Mass.; Michael G. Drainville, Manville, R.I.; Norman O. Fonteneau, Achusnet; Joseph J. Lewicke, Foxboro, both of Mass.

[73] Assignee: The Foxboro Company, Foxboro, Mass.

[21] Appl. No.: 437,336

[22] Filed: May 9, 1995

[51] Int. Cl.$^6$ ........................................... G01F 1/32
[52] U.S. Cl. ........................ 73/861.22; 73/861.18
[58] Field of Search ........................ 73/861.19, 861.18, 73/861.21, 861.22

[56] References Cited

U.S. PATENT DOCUMENTS

| | | | |
|---|---|---|---|
| 3,978,416 | 8/1976 | Sutphin | 328/167 |
| 4,158,818 | 6/1979 | Lerner | 328/167 |
| 4,204,171 | 5/1980 | Sutphin | 328/167 |
| 4,545,258 | 10/1985 | Coursolle | 73/861.22 |
| 4,809,558 | 3/1989 | Watson et al. | 73/861.22 |
| 4,934,194 | 6/1990 | Itoh et al. | 73/861.22 |
| 4,966,040 | 10/1990 | Ohmae | 73/861.22 |
| 5,309,771 | 5/1994 | Lew et al. | 73/861.22 |
| 5,429,001 | 7/1995 | Kleven | 73/861.22 |
| 5,435,188 | 7/1995 | Lew et al. | 73/861.22 |

Primary Examiner—Richard Chilcot
Assistant Examiner—Max Noori
Attorney, Agent, or Firm—Clare Hartnett; David Barron; Jules Jay Morris

[57] ABSTRACT

A method and apparatus for increasing the resolution and accuracy of flow measurements made by vortex flowmeters through the use of an adaptive filter. A vortex sensor signal is conditioned by a bandpass filter whose corner frequencies are dynamically altered as a function of the measured frequency of the vortex sensor signal. When the change in frequency is relatively small, the filters' corner frequencies are set to track the frequency signal in accordance with a specified bandwidth thereby improving the signal-to-noise ratio. For large frequency changes, a new frequency signal is searched for thereby avoiding tracking erroneous noise signals. Furthermore, compensation for additional or missed vortex pulses is made thereby generating a more accurate vortex frequency measurement.

13 Claims, 8 Drawing Sheets

ADAPTIVE FILTERING FOR A VORTEX FLOWMETER

BACKGROUND

1. Technical Field

This invention relates to industrial process control instrumentation, more particularly, adaptive filtering techniques.

2. Background Art

It has been known for many years that vortices are developed in a fluid flowing past a non-streamlined obstruction. It also has been known that with certain arrangements vortices are developed by alternate shedding at regular intervals from opposite edges of the obstruction to form corresponding rows of vortices. Such vortices establish a so-called von Karman "vortex street," which is a stable vortex formation consisting of two nearly-parallel rows of evenly-spaced vortices traveling with the flow stream.

In a von Karman vortex street, the vortices of one row are staggered relative to those of the other row by approximately one-half the distance between consecutive vortices in the same row. The spacing between successive vortices in each row is very nearly constant over a range of flow rates, so that the frequency of vortex formation is correspondingly proportional to the velocity of the fluid. Thus, by sensing the frequency of vortex formation it is possible to measure the fluid flow rate. Devices for that purpose are often referred to as vortex meters or vortex flowmeters.

Various types of vortex meters have been available commercially for a number of years. Typically, these vortex meters comprise a vortex-shedding body mounted in a flow tube together with a sensor for detecting the generation of vortex formation. Sensors used to detect the vortices often include diaphragms which fluctuate in response to alternating differential pressure variations generated by the vortices. The pressure applied to the diaphragms is transferred to a sensor or transducer which then produces electronic signals responsive to differential pressure variations applied to the diaphragms. This differential pressure measurement is used, in turn, to measure the frequency of vortex formation and ultimately the fluid flow rate or velocity.

The sensor produces an analog sinusoidal voltage signal with frequencies ranging from 0 Hz to 3200 Hz. Various types of electronic components are used to condition and process the vortex sensor signal and thereby measure the flow rate. In many applications, the flowmeter circuitry is constrained by cost and, in addition, power consumption in order to adhere to industrial instrumentation standards.

One such type of signal conditioning component is an electrical filtering circuit for sifting out noise signals associated with the acoustic, electrical, and mechanical vibration sources existing in the ambient flowmeter surroundings. Vortex sensor generated signals distorted by these noise signals result in errors in counting the vortex shedding frequency and, consequently, in measuring the flow rate. To alleviate this error, the signal passes through a bandpass filter which passes a specified band of frequencies while attenuating all signals outside the band. Due to the variable frequency range of the vortex signal arising from different size meters and process conditions, the filter needs to be tailored for a particular application.

To avoid having to redesign the filter for each different frequency range, the prior art teaches of various adaptive filtering techniques for adapting or tuning the filter automatically to follow the vortex signal. Tracking filters and filter groups are commonly used techniques.

Tracking filters have a frequency pass band that tracks or follows the changing frequency of a signal applied to its input. These filters consist of an active filter and a feedback means to control a preselected frequency pass band of the filter in accordance with the frequency of the output signal from the filter. However, tracking filters can lock on to noise signals rather than the vortex signal, thereby giving a false measure of the flowrate.

Filters groups consist of a plurality of electronic filters having a control mechanism which switches on the appropriate filters in response to the measured vortex shedding frequency. This technique is costly, requiring complex circuitry and consuming a large amount of power.

Both of these techniques are of limited value for industrial applications requiring low power consumption, low cost component construction, and reliable performance. Accordingly, there exists a need for an improved apparatus for adaptively filtering the vortex sensor signal used in industrial process instrumentation.

It is an object of this invention to provide a reliable technique for filtering a variable frequency analog vortex sensor signal.

It is a further object of the invention to provide a filtering technique as described above constructed with low cost components and utilizing low power consumption.

It is a further object to provide a filter as described above which is dynamically tunable to the frequency of the input signal while avoiding locking onto noise signals.

It is another object to provide a filter as described above which provides a clock-controlled tunable means for altering the corner frequencies of a band-pass filter in response to a variable-frequency analog sinusoidal input signal.

Other general and specific objects of this invention will be apparent and evident from the accompanying drawings and the following description.

SUMMARY OF THE INVENTION

A method and apparatus for providing a micro-power adaptive filtering technique for a variable frequency analog vortex sensor signal is herein described.

The apparatus of the invention comprises an analog signal conditioner and micro-controller for determining the flow rate of a process. An analog sinusoidal signal representative of the alternating differential pressure variations is generated by a vortex sensor. The vortex signal is used to calculate the fluid flow rate or velocity. It is processed by an analog signal conditioner which filters the signal to eliminate frequency signals attributable to acoustic, electrical, and mechanical vibration sources existing in the ambient surroundings in flow measuring environments. The filtered signal is then transmitted to a square wave generator producing an equivalent digital square wave pulse train for use in computing the measured vortex frequency and ultimately the flow rate of the process.

The analog signal conditioner utilizes a bandpass filter comprising a low pass and high pass filter whose corner frequencies are under the control of the micro-controller. The settings of these corner frequencies are based on the measured vortex frequency of the vortex sensor signal and are altered to achieve a desired bandwidth about the vortex frequency. This bandwidth preserves a high signal-to-noise ratio which in effect produces a more accurate flow measurement over a wider flow range under adverse flow conditions.

The method of the invention is designed to preserve the specified bandwidth about a changing vortex frequency. As the vortex frequency changes, the corner frequencies of the filters are dynamically adjusted to track the vortex frequency signal accordingly. However, for rapid changes in the vortex frequency, the bandwidth is opened wide and a renewed search for the vortex signal is initiated thereby avoiding locking onto an erroneous noise signal. Furthermore, the method compensates the vortex sensor signal for added or missed vortex pulses thereby producing a more accurate measurement of the vortex frequency.

The electronic circuitry implementing the invention is designed to consist of low-cost components and to operate at micro-power levels being in the order of less than 10 mW. Both of these considerations are essential for industrial instrumentation.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same elements throughout the different views. The drawings are schematic representations of control elements, emphasis being placed on illustrating the principles of the invention.

DESCRIPTION OF THE ILLUSTRATED EMBODIMENT

A method and apparatus for providing a micro-power adaptive filtering technique suitable for a variable frequency analog vortex sensor signal is herein disclosed.

As is well known in the art, a vortex shedding flowmeter can be prepared by placing a non-streamlined obstruction (commonly referred to as a vortex shedder bar) in the fluid flow together with a sensor for detecting the generation of vortex formation. Sensors used to detect the vortices often include diaphragms which fluctuate in response to alternating differential pressure variations generated by the vortices. The sensor generates an analog sinusoidal signal representative of these altering differential pressure variations which is used to calculate the frequency of vortex formation and ultimately the fluid flow rate or velocity.

Figure 2:
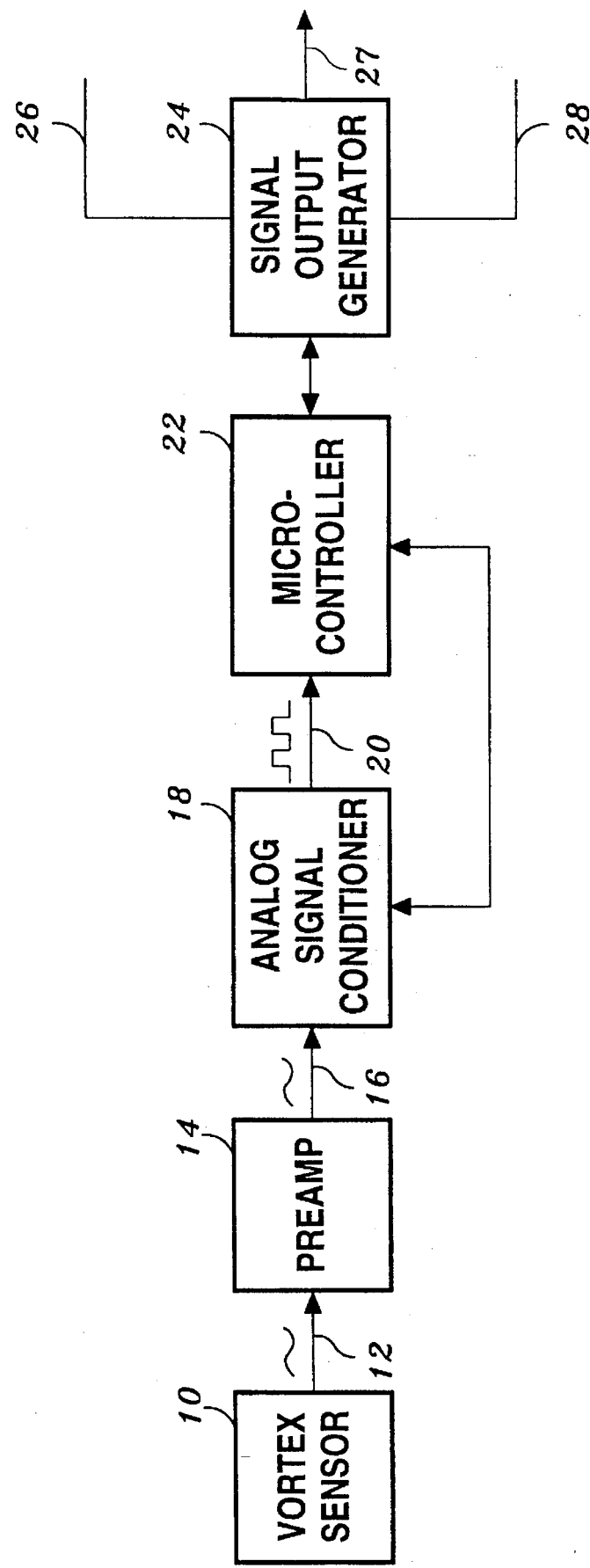
FIG. 2 is a functional block diagram of the various electronic stages used in processing the vortex sensor signal according to the preferred practice of the invention.

Referring more particularly to the drawings and initially to FIG. 2, there is shown the basic components involved in generating an electrical output signal representative of the process flow rate. The vortex sensor, 10, generates an analog sinusoidal signal, 12, with frequencies ranging approximately from 0 Hz to 3200 Hz. However, this invention is not limited to this frequency range as others may be used. The vortex signal, 12, is then buffered and amplified by a standard preamplifier, 14, generating signal 16. Signal, 16, is transmitted further to an analog signal conditioner, 18, which filters out noise signals associated with the signal resulting from acoustic, electrical, and mechanical vibration sources existing in the ambient surroundings in flow measuring environments. Analog signal conditioner, 18, also transforms the signal 16, into a square-wave pulse train, 20, of constant voltage height and having a frequency equal to the frequency of the vortex shedding. Micro-controller 22 counts the number of edges of square-wave pulse train 20 occurring in a measured time interval. This information is used by micro-controller 22 to compute the frequency of the vortex signal. Micro-controller 22 then converts this frequency to a flow rate in engineering units, and instructs the signal output generator 24 to output the result as a 4 to 20 mA signal 26, digital signal 27, or, alternatively, as a scaled pulse signal 28.

Figure 1:
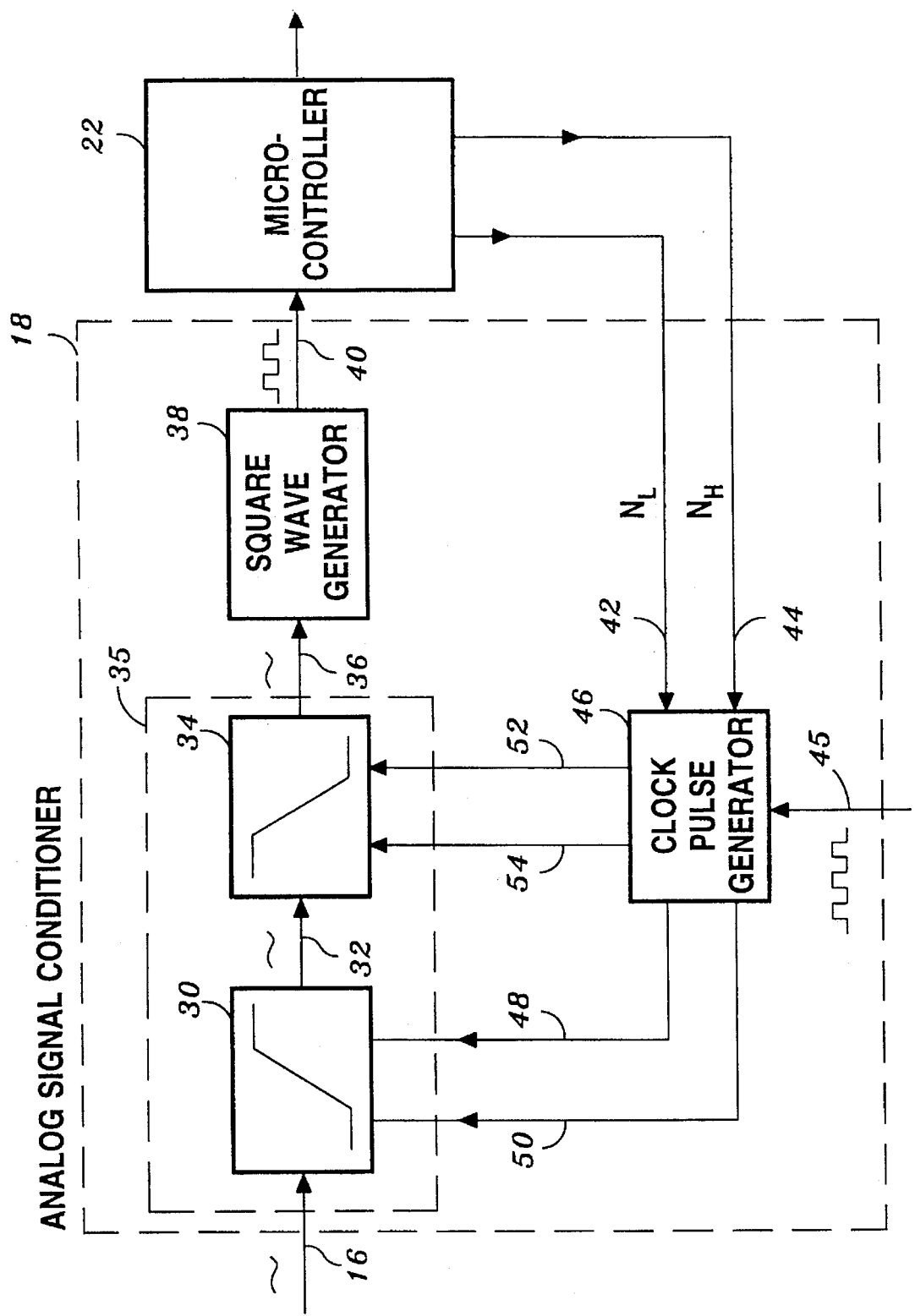
FIG. 1 is a functional block diagram of the electrical components employed by the analog signal conditioner.

FIG. 1 depicts the basic components of analog signal conditioner 18. Referring to FIG. 1, analog signal conditioner 18 consists of a bandpass filter 35, composed of a cascaded high pass filter 30 and low pass filter 34, for filtering out the noise distortions from input signal 16; square-wave generator 38 for converting the filtered input signal into a square-wave pulse train 40; and a dock pulse generator 46 which is used to adaptively set the corner frequencies of the low pass and high pass filters under the control of micro-controller 22.

High pass filter 30 is a second-order active filter whose low corner frequency is dynamically tunable. The filter is controlled by clock pulse signal 48 and its inverted counterpart 50, which are generated by dock pulse generator 46. The frequency of dock pulse signals 48 and 50 effectively determines the corner frequency of high pass filter 30. This frequency is determined by micro-controller 22 and its corresponding factor 42 is transmitted to dock pulse generator 46. Micro-controller 22 determines this frequency as a function of the vortex signal frequency, $F_{VOR}$. The measurement of the vortex signal frequency, $F_{VOR}$, is compensated for missed and added vortices computed by micro-controller 22 which will be discussed in detail below. The output of high pass filter 30 is a partially filtered signal 32 which is transmitted to low pass filter 34.

Low pass filter 34 is a second-order active low pass filter controlled by clock pulse signal 52 and its inverted counterpart 54, which are also generated by dock pulse generator 46. The frequency of clock pulse signals 52 and 54 determines the corner frequency of low pass filter 34. The clock pulse frequency is determined by micro-controller 22 and a corresponding signal 44 is transmitted to dock pulse generator 46. Micro-controller 22 determines this frequency as a function of the vortex signal frequency in a similar fashion as discussed above. The output of low pass filter 34 is filtered signal 36 which is transmitted to square-wave generator 38.

Square-wave generator 38 converts filtered signal 36 into a square-wave pulse train 40 having a constant voltage height and frequency equal to the frequency of the vortex shedding. The edges of the pulse train correspond to the zero crossings of the original vortex signal. Micro-controller 22 counts a number of positive-going edges occurring over a time interval. Counters $N_P$ and $N_C$ are used for this computation and will be described in further detail below. Micro-controller 22 also determines whether the sampled pulse train needs to be corrected for added or dropped pulses. An added pulse is an erroneous pulse detected due to noise disturbances. A dropped pulse occurs when a vortex failed to form at the vortex shedder bar. Counter, $N_-$, indicates the number of calculated dropped pulses and counter, $N_+$ indicates the number of added pulses. Once the frequency of the vortex signal is determined micro-controller 22 then, in turn, computes the appropriate frequency factors $N_L$, $N_H$, signals 42, 44 respectively which will adjust the corner frequencies for the low pass and high pass filters. Therefore, micro-controller 22 can be used to dynamically alter the filter settings of both the high pass and low pass filters based on the measured frequency of the vortex signal, herein denoted as $F_{VOR}$.

Figure 4:
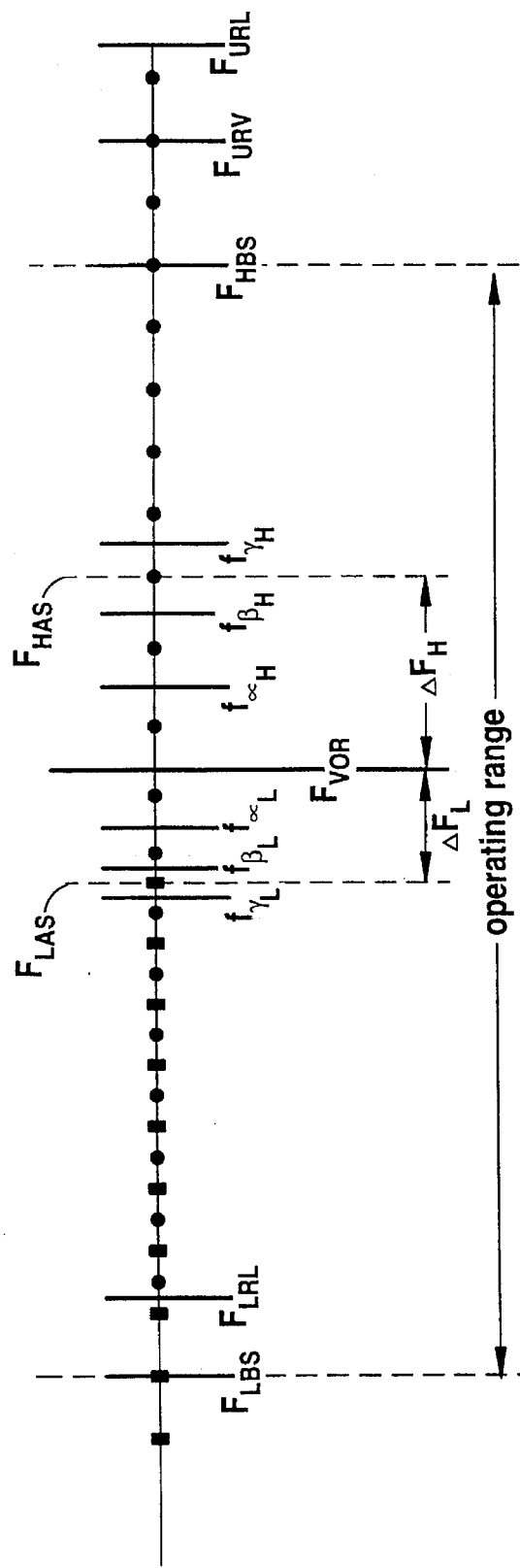
FIG. 4 is a diagram illustrating the filter settings used in the preferred practice of the invention.

As detailed below, the function of the combination of the high pass filter and the low pass filter is to concentrate the electronic sensitivity on a limited range of frequencies in which the vortex signal is likely to be found. Turning now to FIG. 4, $F_{LAS}$ is the cut-off of the high pass filter, and $F_{HAS}$ is the cut-off of the low pass filter. To the left of $F_{LAS}$ and to the right of $F_{HAS}$ the signal is attenuated by the filters in order to reduce the likelihood of system noise from whatever source interfering with the vortex signal. The frequency of the passing vortices $F_{VOR}$ would be located approximately at a specified position between these two cut-offs for the filters when the filter tracking function is operating. Signals of large amplitude well outside of the two cut-offs (to the left or the right) would be substantially attenuated. The further a noise signal frequency is from the tracked frequency range, the more it is attenuated and the less likely to generate an erroneous pulse count. This depends on both signal frequency and amplitude to distinguish noise from passing vortices.

Filter attenuation serves to optimize the signal to noise ratio. The filters in a tracking mode therefore fully optimize the signal to noise ratio by attenuating signals that are unlikely to have been caused by the passing vortices. If the frequency of the vortices $F_{VOR}$ begins to change due to an increase or decrease in flow, the tracking filter will be adjusted to move the cut-off filter limits to avoid the situation where the vortex signal is attenuated due to its being outside the high pass or low pass limits. When there are rapid changes in the vortex frequency, the filters are set in a search mode which has a lower signal to noise ratio but is more capable of picking up $F_{VOR}$ wherever it is occurring within the flowmeter's normal operating range. The search mode moves the filter cut-offs so that the signals within the bandwidth are unattenuated thereby increasing the signal to noise ratio as described below. Once tracking of the vortex signal begins, the bandwidth is preserved.

Figure 3:
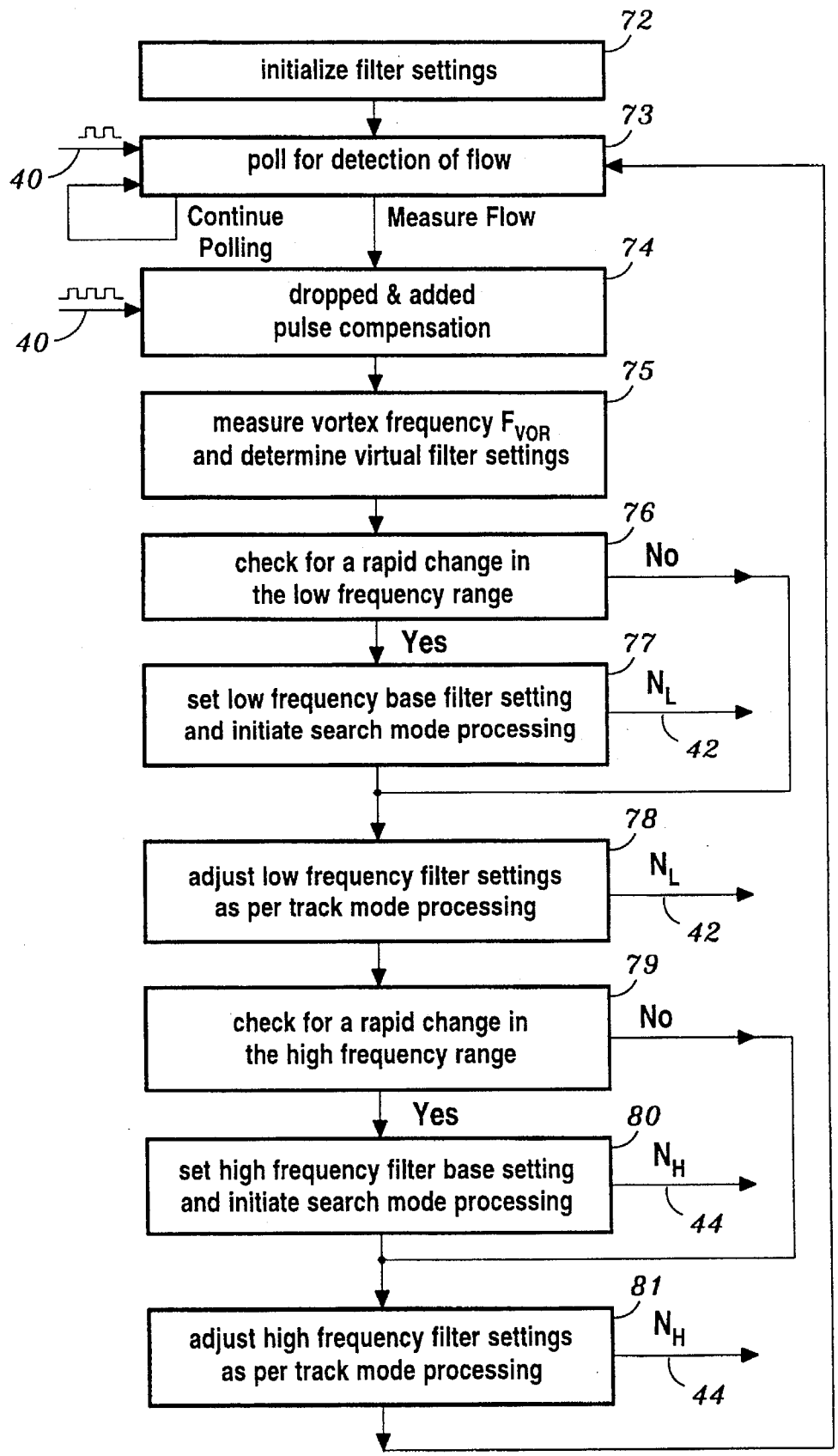
FIG. 3 is a block diagram illustrating the steps used in computing the adaptive filter settings of the corner frequencies of the low and high pass filters based on the measured vortex frequency.

FIG. 3 depicts the steps employed in the adaptive filtering scheme. Prior to discussing these steps, the filter settings used in this scheme will be presented first. There can be four classifications of settings: frequency range limits, base settings, adaptive filter settings, and virtual settings. The frequency range limits, $F_{URL}$, and $F_{LRL}$, define the frequencies for which the vortex flowmeter does not experience severe mechanical and/or electrical interferences while $F_{URV}$ is a user defined limitation. For example at certain flow velocities, the vortex flowmeter can be subjected to mechanical damage. The frequency threshold above which this velocity occurs can represent the upper frequency range limit $F_{URL}$. The low frequency range limit $F_{LRL}$ represents the frequency threshold at which point the signal to noise ratio is high enough to distinguish the vortex signal. The upper frequency range value $F_{URV}$ is a user-defined limit which represents the highest frequency range that a particular application prefers. Once set these frequency range limits are not altered by the adaptive filtering scheme.

The base settings, $F_{LBS}$ and $F_{HBS}$, define the frequency range within which the adaptive filtering scheme operates. They are defined by the particular application and once set are not altered by the adaptive filtering scheme. The adaptive filter settings, $F_{LAS}$ and $F_{HAS}$, can be used to preserve a specific bandwidth about the measured frequency of the vortex signal thereby preserving a high signal to noise ratio. The adaptive filter settings vary as the frequency of the vortex signal changes. Both the base and adaptive filter settings are "real" settings in that the filtering circuitry can be implemented to obtain one of these frequencies. By contrast the virtual settings are "virtual" as they can be derivations that are used to indicate whether the adaptive filtering scheme is to proceed in either a search or track mode as detailed below.

Referring again to FIG. 4, the upper range frequency limit, $F_{URL}$, is based on two flow velocity constraints that limit the upper range flow rate. Both are imposed to avoid mechanical damage of the flowtube and sensor. There is also a high frequency limit, $F_{HEL}$, imposed by the electronics that can limit the upper range flow rate. The first velocity constraint, $V_{PL}$, is that the differential pressure generated by the vortex shedding should not exceed a specified value set in accord with the following mathematical relation: $V_{PL} \leq 200/\sqrt{\rho}$ where $\rho$ is the process fluid density. The second is the sonic limit, $V_{SL}$ which is imposed to prevent supersonic conditions which can cause shock waves. Preferably, it can be set to the value of 600 feet/sec.

The flow rate limits associated with these two velocity limits are $Q_{PL}=A*V_{PL}$, and $Q_{SL}=A*V_{SL}$, where A is the cross-sectional area of the flow tube. The corresponding upper range frequency limit $F_{URL}$ is given by $K*Q_{PL}$, $K*Q_{SL}$, or $F_{HEL}$, whichever is smaller, where K is the meter factor at the relevant process conditions. In most applications the nominal upper range flow value $Q_{URV}$ is significantly less than the upper range flow limit $Q_{URL}$. In this case the user sets the desired upper range flow value. The corresponding upper range frequency value $F_{URV}$ is given by $K*Q_{URV}$, which is less than $F_{URL}$.

The lower range flow velocity limit, $V_{LRL}$, which is the nominal flow velocity below which the output of the vortex sensor is set to zero is defined by the following mathematical relation: $V_L \leq k/\sqrt{\rho}$, where k is a constant whose value depends on the sensor type process conditions. The lower range flow rate limit can be given by $Q_{LRL}=A*V_{LRL}$, where A is the cross-sectional area of the flow tube. The corresponding lower range frequency limit is $F_{LRL}=K*Q_{LRL}$, where K is the meter factor at the relevant process conditions.

The lower and upper range frequency limits can be used to establish two base settings: a base setting for the corner frequency of the high pass filter, denoted as $F_{LBS}$; and another for the corner frequency of the low pass filter, denoted as $F_{HBS}$. These base settings represent the operating range for the adaptive filtering scheme. The corner frequency of the high pass filter $F_{LBS}$ can be set equal to or the next closest setting below some fraction of the lower frequency range limit; preferably ⅔ of $F_{LRL}$. The corner frequency of the low pass filter Fuss can be initially set equal to or at the next closest setting above some fraction of the upper frequency range value, preferably ½ of the $F_{URV}$.

There can also be two adaptive filter settings based upon the frequency of the vortex signal, $F_{VOR}$. For the purposes of this application, the adaptive setting for the corner frequency of the high pass filter is denoted as $F_{LAS}$, and the adaptive setting of the corner frequency of the low pass filter is denoted as $F_{HAS}$. The purpose of these settings is to preserve a specific bandwidth, $\Delta F_L + \Delta F_H$, about the frequency of the vortex signal. This frequency bandwidth is set to improve the signal to noise ratio thereby producing more accurate flow measurements for a wider flow range and under adverse flow conditions. Preferably, a high signal to noise ratio is desired so that the vortex signal is distinguishable from the noise signals. Additionally, the filter settings must not be too close to the vortex frequency signal otherwise the vortex signal will be attenuated.

The low frequency part of the bandwidth is denoted as $\Delta_{FL}$ and the high frequency part of the bandwidth is denoted as $\Delta F_H$. The low frequency part of the bandwidth, $\Delta F_L$, is narrower than the high frequency portion of the bandwidth, $\Delta F_H$. This is due to the predominance of low frequency disturbances present in vortex flowmeters. An increase of these disturbances is seen with low flow rates where due to smaller signal levels filtering becomes more important. Therefore to accommodate these types of disturbances, the low frequency part of the bandwidth, $\Delta F_L$, can be set to approximately one haft of the vortex frequency ($0.5*F_{VOR}$), and the high frequency part of the bandwidth, $\Delta F_H$, can be set to approximately three times the vortex frequency ($3*F_{VOR}$).

Figure 5:
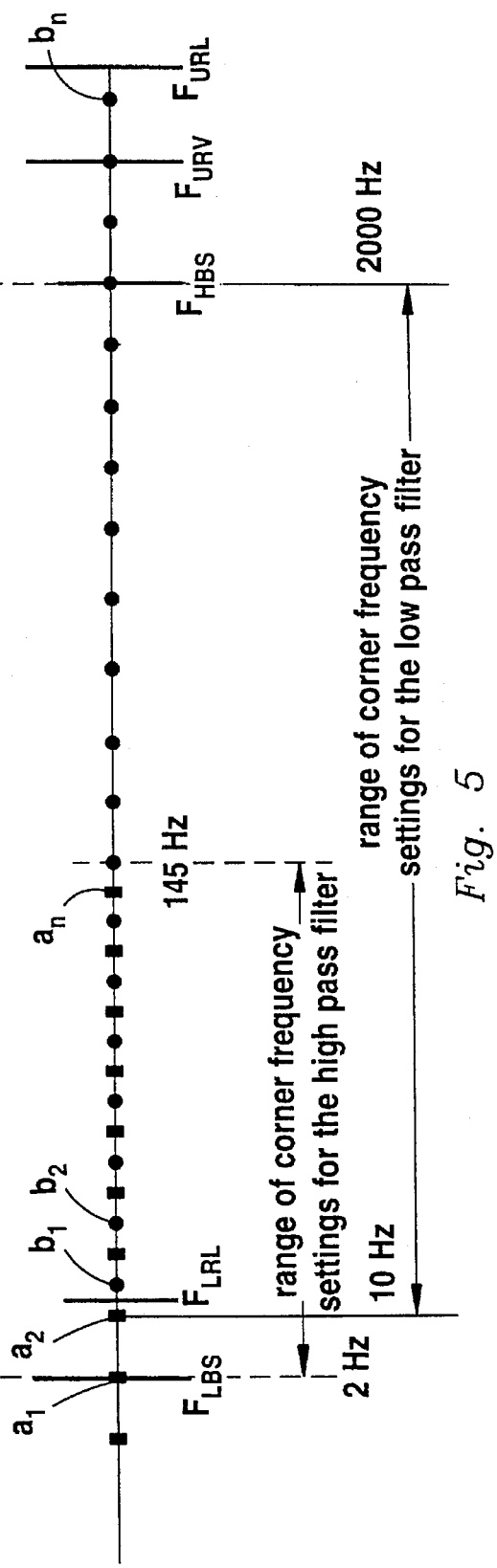
FIG. 5 is a diagram illustrating a range of the frequency settings for the low and high pass filters.

FIG. 5 is a schematic diagram illustrating the range of corner frequency settings for the high and low pass filters. However, it should be noted that this invention is not limited to these values as they are chosen for illustration purposes. For example, referring to FIG. 5, applications having a vortex signal with frequencies within the range of 0 Hz to 3200 Hz, the range of the corner frequency of the high pass filter can be between 2 Hz to 145 Hz, and the range of the corner frequency of the low pass filter can be between 10 Hz and 2000 Hz. Within these ranges there can be a finite number of corner frequency filter settings uniformly distributed geometrically over the frequency range. The finite number of corner frequency filter settings is advantageous for obtaining a specific setting through a digital signal. For example, within the low filter frequency range, there can be m settings, $a_1, \ldots a_m$, and within the high filter frequency range n settings $b_1, \ldots b_n$. Preferably m and n can be set to a value of 32. In this instance, a specific setting can then be obtained by a digital signal having a value which can be represented by at least 5 bits in length (i.e. $2^5=32$).

Referring to FIG. 4, there are also six virtual settings which can be utilized to determine when the adaptive filtering scheme is to process in track mode or search mode. In search mode, the bandwidth about the measured vortex frequency is opened wide and a renewed search for the vortex signal is initiated. This usually occurs when rapid changes are present in the vortex frequency. This prevents the filtering scheme from locking onto an erroneous noise signal. By contrast in the tracking mode, the filtering scheme maintains a specified bandwidth about the measured vortex frequency. The virtual settings which relate to the low frequency part of the bandwidth are $f_{\gamma L}$, $f_{\beta L}$, $f_{\alpha L}$ and those which relate to the high frequency part of the bandwidth are $f_{\gamma H}$, $f_{\beta H}$, $f_{\alpha H}$. These settings are set in relation to the measured vortex frequency $F_{VOR}$ and are considered virtual as they may not be at one of the predefined corner frequency filter settings, $a_m$ or $b_n$. However, these virtual settings are selected so that there is at least one predefined corner frequency filter setting between two consecutive virtual settings and between $F_{VOR}$ and the adjacent virtual setting.

The range defined by the setting $f_{65 L}$-$f_{\beta L}$ is the desired range for maintaining the low corner frequency. Signals below $F_{LAS}$ are attenuated whereas signals within the range $f_{\gamma L}$-$f_{\beta L}$ preserve the low frequency part of the desired bandwidth, $\Delta F_L$. This range is particularly useful for search mode processing. In search mode processing, the adaptive filter setting is adjusted at each processor cycle by one setting until it reaches the first setting within the range defined by $f_{\gamma L}$-$f_{\beta L}$. In the track mode depending on the position of the measured vortex frequency, the setting can be incremented or decreased. It will remain unchanged when $F_{LAS}$ stays within the range defined by $f_{\gamma L}$-$f_{\beta L}$.

Similarly, the range defined by the settings $f_{\beta H}$-$f_{\gamma H}$ is the desired range to maintain the high corner frequency. Signals above $F_{HAS}$ are attenuated whereas signals within the range preserve the high frequency part of the desired bandwidth, $\Delta F_H$. This range is particularly useful for search mode processing. In search mode processing, the adaptive filter setting is adjusted at each processor cycle by one setting until it reaches the first setting within the range defined by $f_{\beta H}$-$f_{\gamma H}$. In the track mode depending on the position of the measured vortex frequency, the setting can be incremented or decreased. It will remain unchanged when $F_{HAS}$ stays within the range defined by $f_{\beta H}$-$f_{\gamma H}$.

The frequency $F_\alpha$ defines the point at which the filtering scheme reverts to search mode processing. In search mode, the filtering scheme stops tracking the current signal, sets the filter back to its base settings, and then reinitiates its search for the vortex signal. This is done to prevent the filter from locking onto a noise signal. A measured vortex frequency greater than the frequency defined by $f_{\alpha L}$ or less than the frequency defined by $f_{\alpha H}$ triggers the adaptive filtering scheme to revert to the base setting and then to initiate the search mode.

As the various settings used in the adaptive filtering scheme have been described above, a detailed description of the scheme is herein presented. Referring to FIG. 3, in step 72, the first step of the adaptive filtering scheme is to determine the frequency range limits and base settings of the bandwidth. These settings are determined and set as discussed above and remain constant for a given application. The adaptive filter settings, $F_{LAS}$ and $F_{HAS}$, can vary throughout the adaptive filtering scheme and initially can be set to their respective base settings, $F_{LAS}=F_{LBS}$, $F_{HAS}=F_{HBS}$.

Next, as illustrated in step 73, micro-controller 22 can be employed to detect the presence of flow from square-wave pulse train 40. If no flow is detected, satellite micro-controller 22 continues to poll. The presence of flow can be determined by measuring the periods of five successive pulses. If the periods for each of the five successive pulses are approximately identical, then it can be determined that flow is present.

Once the presence of flow is detected, the vortex signal 40 is analyzed for dropped and added pulses in step 74. This is done in order to accurately determine the vortex shedding frequency. An added pulse may be considered when a sensor signal of sufficient amplitude is recorded to indicate a passing vortice. This signal must be compared with the frequency of vortex pulses most recently received from the sensor. A comparison of the period between the most recently received pulse and the median period for the present and four previous pulses should be closely matched.

If the period between pulses is too short, shorter than a reasonable variation based on the recent median period as described below, then the pulse received is considered an added pulse. This analysis is based on the assumption that the flowrate and hence the vortex frequency will generally change in a gradual manner and will not be subject to extremely rapid changes or discontinuities. These added pulses can be caused by noise generated from any number of sources that then might be transmitted through the fluid or piping to the vortex sensor. Possible sources include nearby equipment tuning on and off, mechanical vibrations, and electronic noises. In such a situation, as described below, an internal counter in the controller is incremented to indicate an added pulse not generated by flow vortices passing the vortex sensor.

In the converse of the above situation, the period between sequential pulses may be greater than can be reasonably expected based on the frequency of the most recent pulses and period between them. It can then be surmised that a vortex failed to form at the vortex shedder or was not detected for some reason. This can arise due to turbulence or debris in the flow stream flowing past the vortex shedder that result in the failure to form vortices of sufficient amplitude to be detected by the vortex sensor electronics. It should be noted that the vortex sensor signal is compared with a cut-off amplitude such that frequencies below a predetermined amplitude will not result in the generation of an electronic pulse. In these situations, the dropped pulse counter in the controller is incremented in order to artificially compensate for the missing pulse. This results in a more accurate average vortex frequency. A relatively low number of missing pulses, if not compensated for, could substantially affect the average vortex frequency calculation. The actual adding and dropping of pulses is described as follows.

Figure 6:
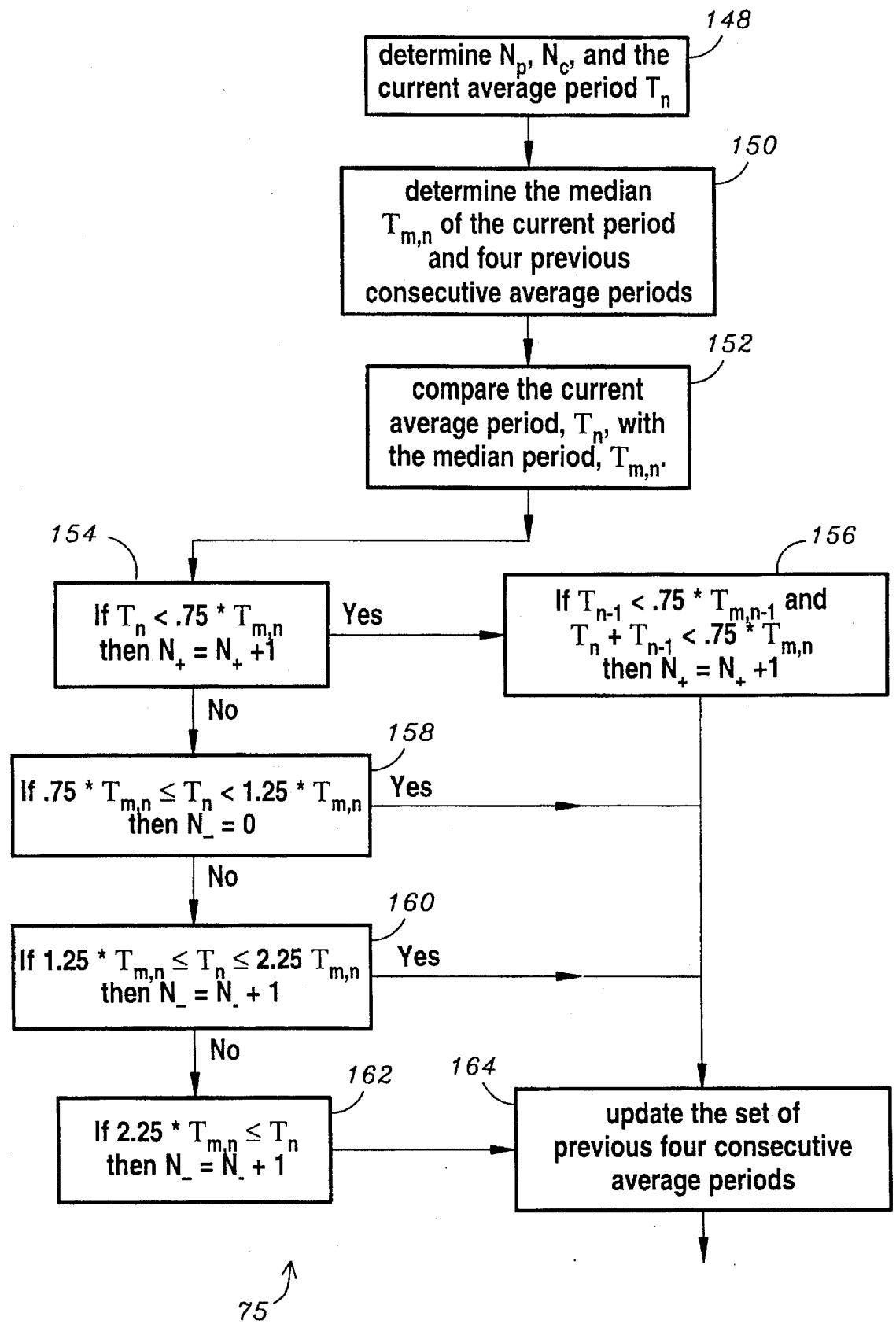
FIG. 6 is a block diagram illustrating the steps used in determining the number of dropped and added pulses.

The added and dropped compensation scheme can utilize four counters: $N_P$, the total number of sampled pulses; $N_C$, the total number of clock cycles; $N_-$, the number of dropped pulses over a sampling period; $N_+$, the number of added pulses over the same sampling period. The scheme commences with controller 22 detecting the zero crossings of square-wave pulse train 40 for a number of clock cycles. For the purposes of this application, the term clock cycle denotes the micro-controller's internal clock pulse period. The sampling period constitutes a number of clock cycles. At a specific instant of time, the total number of pulses sampled or vortices is denoted as $N_P$ and the total number of clock cycles is denoted as $N_C$. A sampling period is denoted as $\Delta N_C$ which can be defined as the arithmetic difference between two clock cycle counts. Similarly, the number of vortices counted over a specified time interval can be denoted as $\Delta N_P$ and can be defined as the arithmetic difference between two vortex pulse counts computed over the same time interval. Referring now to FIG. 6, in step 148, controller 22 can determine $N_P$, $N_C$, and hence $\Delta N_C$, $\Delta N_P$, in order to determine the average frequency $F_{VOR}$. The average frequency can be determined as $F_C (\Delta N_P/\Delta N_C)$, the ratio of the number of vortex pulses sampled over the sampling period, where $F_C$ is the frequency of the clock pulses. Counters $\Delta N_P$ and $\Delta N_C$ also be used in the determination of the vortex frequency. The average vortex period $T_N$ is given by the inverse of the average frequency.

The median and average period is used in the determination of the number of added and dropped pulses. In step 150, the median period is calculated as the median of the present and four previous consecutive average periods, and is denoted herein as $T_{m,n}$. A comparison of the current or last average period, $T_n$, is made with the median period $T_{m,n}$ in step 152 against a criteria which determines whether a missed pulse or an added pulse has occurred. It is expected that pulses should be present within a certain range of the median period. If pulses are not detected within this expected range, then it is assumed that a dropped pulse has occurred. Pulses that are detected earlier than the expected range are considered added pulses. Preferably, the expected range is +/–25% of the median period. However, this invention is not constrained to this particular range. Others may be used so long as they are large enough to capture the natural variations in the period and not loose any of the naturally formed vortices. Any expected range of less than 50% of the median period could meet this requirement.

In step 154, if the current average period is less than ¾ths of the median period, $T_n<0.75*T_{m,n}$, then it is assumed that one added pulse has occurred. The computation proceeds, in step 156, to determine whether a second added pulse has occurred. This is assumed when the average period of the previous pulse is detected before the expected range and the sum of the current and previous pulses are detected before the expected range. This occurs if the following mathematical relation holds: $T_{n-1}<0.75* T_{m,n-1}$ and $T_n+T_{n-1}<0.75*T_{m,n}$. The added pulse counter, N+, is incremented accordingly.

The criteria set forth in step 158 determines whether a normal vortex pulse has occurred. This occurs if the following mathematical relation is met: $0.75*T_{m,n}<=T_n<1.25*T_{m,n}$. Next, the criteria set forth in step 160 determines whether a dropped pulse has occurred. This happens when no pulse is detected after the expected range after one full median period has lapsed. This occurs if the following mathematical relation is met: $1.25*T_{m,n}<=T_n<2.25*T_{m,n}$. The detection of two dropped pulses is made in step 162 and occurs if no pulse is detected after the expected range after two full median periods have lapsed. This occurs if the following mathematical relation is met: $2.25*T_{m,n}<=T_n$. If either of these two previous conditions are met, the dropped pulse counter, denoted as $N_-$ is incremented accordingly. The average frequency will not be compensated for more then two consecutive missing pulses. Once the appropriate pulse counters have been updated, the set of four previous consecutive average periods, $T_{n-1}$, $T_{n-2}$, $T_{n-3}$, $T_{n-4}$, is updated to include the current average period and to exclude the oldest average period in step 164.

The added/dropped pulse detection scheme is not constrained to a calculation based on average period measurements. Alternatively, the scheme can utilize frequency measurements in lieu of choosing the current and five previous average periods. Instead of basing the added and dropped pulse compensation on the average and median periods of the pulses contained in signal 40, the scheme can utilize the average and median frequencies of the pulses contained in signal 40. The scheme can proceed in the same manner as detailed above with the exception of the average and median frequencies are used in place of the average and median periods of pulse train 40.

Referring back to FIG. 3, in step 75 the frequency of the vortex signal and the corresponding virtual filter settings are determined. This computation utilizes $\Delta N_P$, $\Delta N_C$, $N_-$, $N_+$ which were computed by micro-controller 22 previously. The vortex frequency can be determined in accord with the following mathematical relation: $F_{VOR}=F_C[(\Delta N_P+N_--N_+)/\Delta N_C]$ where $F_C$ is the frequency of the clock pulses. Once the vortex frequency is determined, the virtual settings $f_{\gamma L}$, $f_{\beta L}$, $f_{\alpha L}$, $f_{\gamma H}$, $f_{\beta H}$, $f_{\alpha H}$ are also determined in step 75. These setting can be set in accord with the following mathematical relations: $f_{\beta L}/f_{\gamma L}=1.5$; $f_{\alpha L}/f_{\beta L}=1.3$; $F_{VOR}/f_{\beta L}=1.64$, $f_{\beta H}/f_{\gamma H}=1.5$; $f_{\alpha H}/f_{\beta H}=1.3$; $F_{VOR}/f_{\gamma H}=0.27$. These settings were chosen to preserve the specified bandwidth $\Delta F_L$, $\Delta F_H$ about the vortex frequency and may change accordingly.

Next, in step 76, a determination is made as to whether the measured vortex frequency $F_{VOR}$ has experienced a rapid change. This check is made in order to prevent the filtering scheme from blindly locking onto a noise signal. This determination can be made relative to the low frequency range by checking the ratio of the latest vortex frequency measurement $F_{VOR}$ over the current adaptive filter setting for the low corner frequency, $F_{LAS}$. If this ratio is less than a certain threshold then a rapid change in the vortex frequency can be assumed to have occurred in the low frequency range. Preferably, the threshold is the value of $F_{VOR}/f_{\alpha L}$ from the most recent measurement of the vortex signal. The invention is not constrained to this value; others may be used so long as rapid changes in the vortex signal are detected. This check can be made in accord with the following mathematical relation: $F_{LAS}>=f_{\alpha L}$. The filtering scheme then enters the search mode. Otherwise, the filtering scheme proceeds in the track mode as discussed below.

In the search mode, step 77, the low portion of the bandwidth is opened wide and a renewed search of the vortex signal is initiated. This is performed by setting the low frequency adaptive filter setting to the low frequency base setting, $F_{LAS}=F_{LBS}$, and advancing the low frequency setting each processing cycle until the low corner frequency enters the $f_{\gamma L}$--$f_{\beta L}$ range. This is accomplished through frequency factor signal $N_L$, 42 which is determined by micro-controller 22 as described below and transmitted to clock pulse generator 46.

Next, in step 78, the filtering scheme proceeds in track mode. In track mode the adaptive filtering setting, $F_{LAS}$, is adjusted by one setting increments until $F_{LAS}$ comes within the range $f_{\gamma L}$-$f_{\beta L}$. For the case where $F_{LAS}$ is within the range $f_{\gamma L}$-$f_{\beta L}$, no adjustment is needed. If $F_{LAS}$ is within the range $f_{\beta L}$-$f_{\alpha L}$ or $F_{LBS}$-$f_{\gamma L}$, an adjustment of one setting is made in the direction towards the range $f_{\gamma L}$-$f_{\beta L}$; incremented by one for the case $F_{LBS}$-$f_{\gamma L}$, and decremented by one for the case $f_{\beta L}$-$f_{\alpha L}$. This adjustment is made through frequency factor signal $N_L$, 42 and is described in further detail below.

Similarly, a determination is made as to whether the measured vortex frequency $F_{VOR}$ has experienced a rapid change in the high frequency range as in step 79. This determination can be made by checking the ratio of the latest vortex frequency measurement $F_{VOR}$ over the current adaptive filter setting for the high corner frequency, $F_{HAS}$. If the ratio exceeds a certain threshold, then a rapid change in the vortex frequency has occurred in the high frequency range. Preferably, the threshold is the value of $F_{VOR}/f_{\alpha H}$ from the most recent measurement of the vortex signal. The invention is not constrained to this value; others may be used so long as rapid changes in the vortex signal is detected. This check can be made in accord with the following mathematical relation: $F_{HAS}<=f_{\alpha H}$. The filtering scheme then enters the search mode. Otherwise, the filtering scheme proceeds in the track mode as discussed below.

In the search mode, step 80, the high portion of the bandwidth is opened wide and a renewed search of the vortex signal is initiated. This is performed by setting the high frequency adaptive filter setting to the high frequency base setting, $F_{HAS}=F_{HBS}$, and tracking the vortex frequency signal until the high corner frequency enters the $f_{\beta H}$-$f_{\gamma H}$ range. This is accomplished through frequency factor signal $N_H$, 44 which is determined by micro-controller 22 as described below and transmitted to clock pulse generator 46.

Next, in step 81, the filtering scheme proceeds in track mode. In track mode the adaptive filtering setting, $F_{HAS}$, is adjusted by one setting increments until $F_{LAS}$ comes within the range $f_{\beta H}$-$f_{\gamma H}$. For the case where $F_{HAS}$ is within the range $f_{\beta H}$-$f_{\gamma H}$, no adjustment is needed. If $F_{HAS}$ is within the range $f_{\alpha H}$-$f_{\beta H}$, or $f_{\gamma H}$-$F_{HBS}$, an adjustment of one setting is made in the direction towards the range $f_{\beta H}$-$f_{\gamma H}$; incremented by one for the case $f_{\alpha H}$-$f_{\beta H}$, and decremented by one for the case $f_{\gamma H}$-$F_{HBS}$. This adjustment is made through frequency factor signal $N_H$, 44 and is described in further detail below.

Once micro-controller 22 determines the recomputed value of the low corner adaptive filter setting, $F_{LAS}$, it computes a frequency factor, $N_L$, 42, which will obtain the desired frequency setting. Signal 42 is transmitted to clock pulse generator 46. Clock pulse generator 46 also receives signal 45 which can be a square-wave pulse train having a constant amplitude and frequency. From these input signals, it produces two signals 48, 50 which have identical amplitude as signal 45 (see FIG. 1) but which are 180 degrees out of phase with respect to each other. Signals 48, 50 can then be used to establish the corner frequency of high pass filter 30 which is one of the m settings in the low frequency filter range.

Signal 42, $N_L$, and signal 44, $N_H$, can be an eight-bit integer having values ranging from 1 to 256. Signal 45 can be a 50% duty cycle square-wave pulse train having a preferred frequency of approximately 500 kHz. However, this invention is not limited to this frequency as long as the choice is divisible by frequency factor 42 resulting in one of the predetermined m low frequency range settings.

Similarly, once micro-controller 22 determines the high corner frequency of the adaptive filter setting, $F_{HAS}$, the corresponding frequency factor $N_H$, 44, is computed and transmitted to clock pulse generator 46. Signal 44 is used by dock pulse generator 46 to generate the appropriate dock frequency which obtains the corner frequency of low pass filter 34. Clock pulse generator 46 proceeds to compute this corner frequency in the same fashion as described above. It results in generating signals 52 and 54, which have identical amplitudes as signal 45 but which are 180 degrees out of phase with respect to each other.

Figure 7:
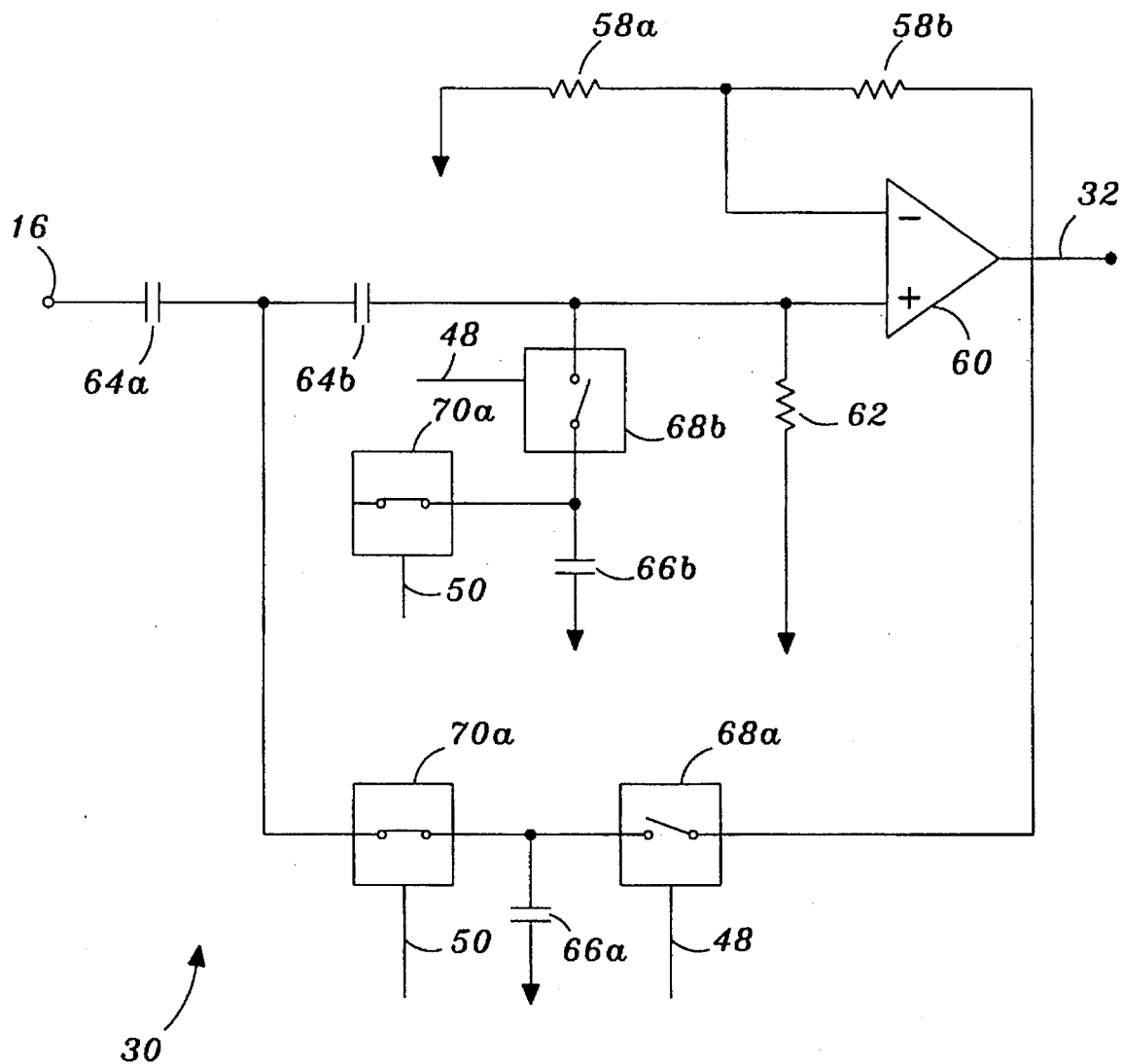
FIG. 7 is a circuit diagram of the second-order high pass filter according to the preferred practice of the invention.

Turning now to the electrical schematics found in FIGS. 7, 8, and 9, the electrical circuitry implementing the adaptive filtering scheme of the cascaded high and low pass filter is discussed below in more detail. FIG. 7 illustrates the circuit elements of high pass filter 30 which represents a novel combination of a known circuit topology, clocking signals, and circuit elements which results in micro-power consumption, particularly well-suited for industrial applications. Referring to FIG. 7, high pass filter 30 is an second order active filter encompassing switched capacitors in an equal-component-value Sallen and Key circuit topology. The benefits of this circuit is three-fold.

First, the switched capacitors offer a significant improvement over conventional resistor-capacitor filters since the effective resistance values can be adaptively modified in accordance with the process flow frequency. By alternately dosing and opening the switched capacitors 66a and 66b at a dock frequency $f_c$ (signals 48, 50), the switched capacitors, effectively simulate a resistor having a value: $R=1/C*f_c$, where C is the value of switched capacitors 66a and 66b. This use of the switched capacitors eliminates the use of resistors thereby diminishing power consumption which is crucial for industrial instrumentation.

Second, the filter can be adapted to variable process fluid frequencies through the use of the dock frequency, $f_c$, thereby eliminating the dependency on statically-sized circuit elements. For the high pass filter, this permits the corner frequency, $F_{LAS}$ of the high pass filter to be dynamically altered to accommodate a particular flow frequency in accordance with the following mathematical relation: $F_{LAS}=\frac{1}{2}\pi*C/C_1*f_c$, where $f_c$ is the clock frequency, and $C_1$ is the value of capacitors 64a and 64b.

Lastly, the use of the equal-component-value second-order Sallen and Key circuit topology is advantageous for providing easy tuning and for independently adjusting damping of the filter response near the corner frequency. Each of these benefits are essential for achieving micro-power consumption, which is in the order of less than 10 mW of power.

High pass filter 30 can consist of operational amplifier 60 having its inverting input terminal connected to the ratio of resistors 58a and 58b. Resistors 58a, 58b serve to set the gain and damping of the circuit. The noninverting input terminal is coupled to two equal-value-component capacitors 66a, 66b which are each coupled to charging switches 70a, 70b and discharging switches 68a, 68b respectively. Switches 68a and 70a are used to control the charge and discharge of capacitor 66a, and switches 68b and 70b are used to control the charge and discharge of capacitor 66b. Switches 68a and 68b are controlled by dock signal 48 and switches 70a and 70b are controlled by dock signal 50, the inverted counterpart of signal 48. Charging switches 70a, 70b, and discharging switches 68a, 68b are alternately opened and dosed at the dock rate specified by the frequency of signals 48 and 50.

Noninverting input terminal 60 is also coupled to resistor 62 and capacitors 64a and 64b. Resistor 50 provides a dc bias path to an electrical ground and is sized preferably at 20M ohms. Capacitors 64a, 64b are of equal value, preferably 0.039 uf and are sized in accordance with the frequency range of signals 48, 50.

Figure 8:
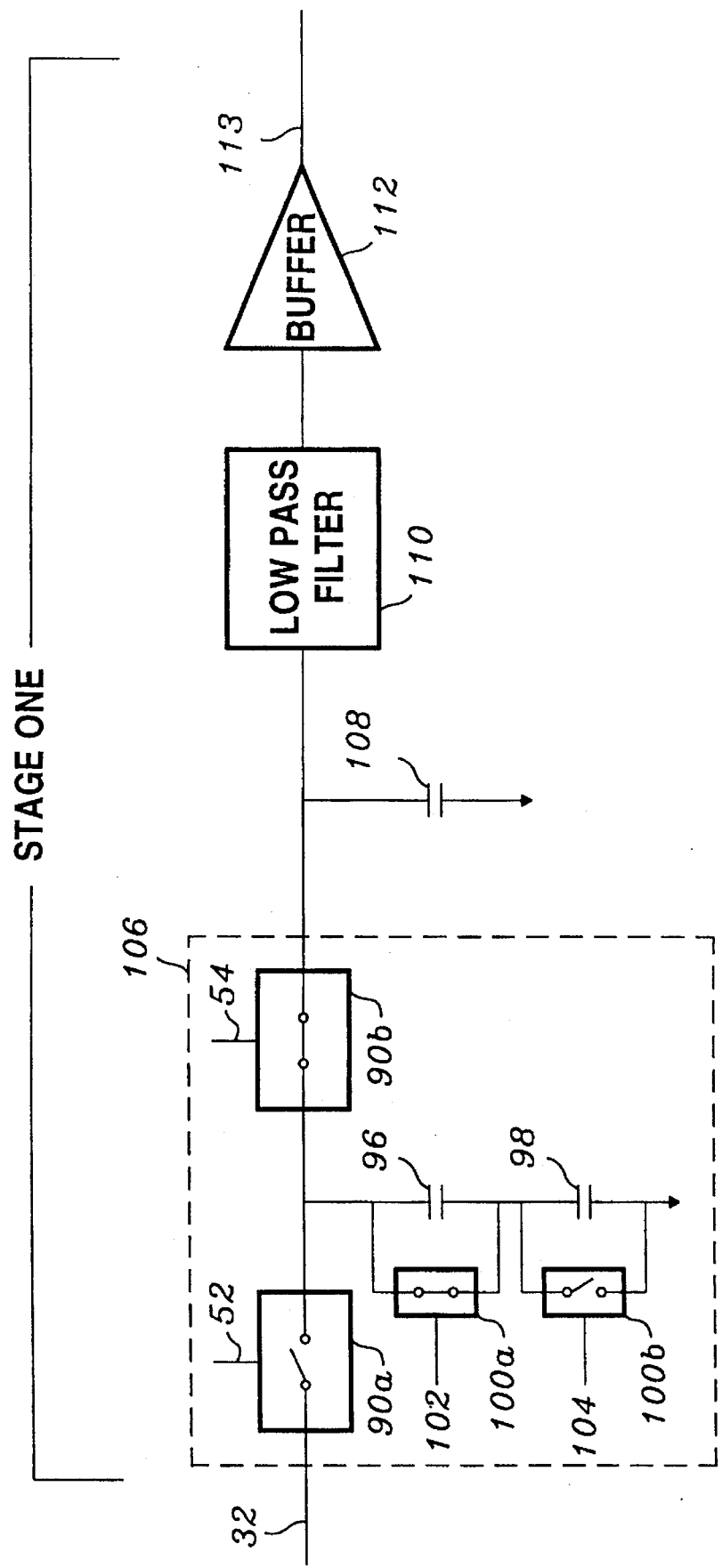
FIG. 8 is a circuit diagram depicting the electrical components used in the first stage of the low pass filter.
Figure 9:
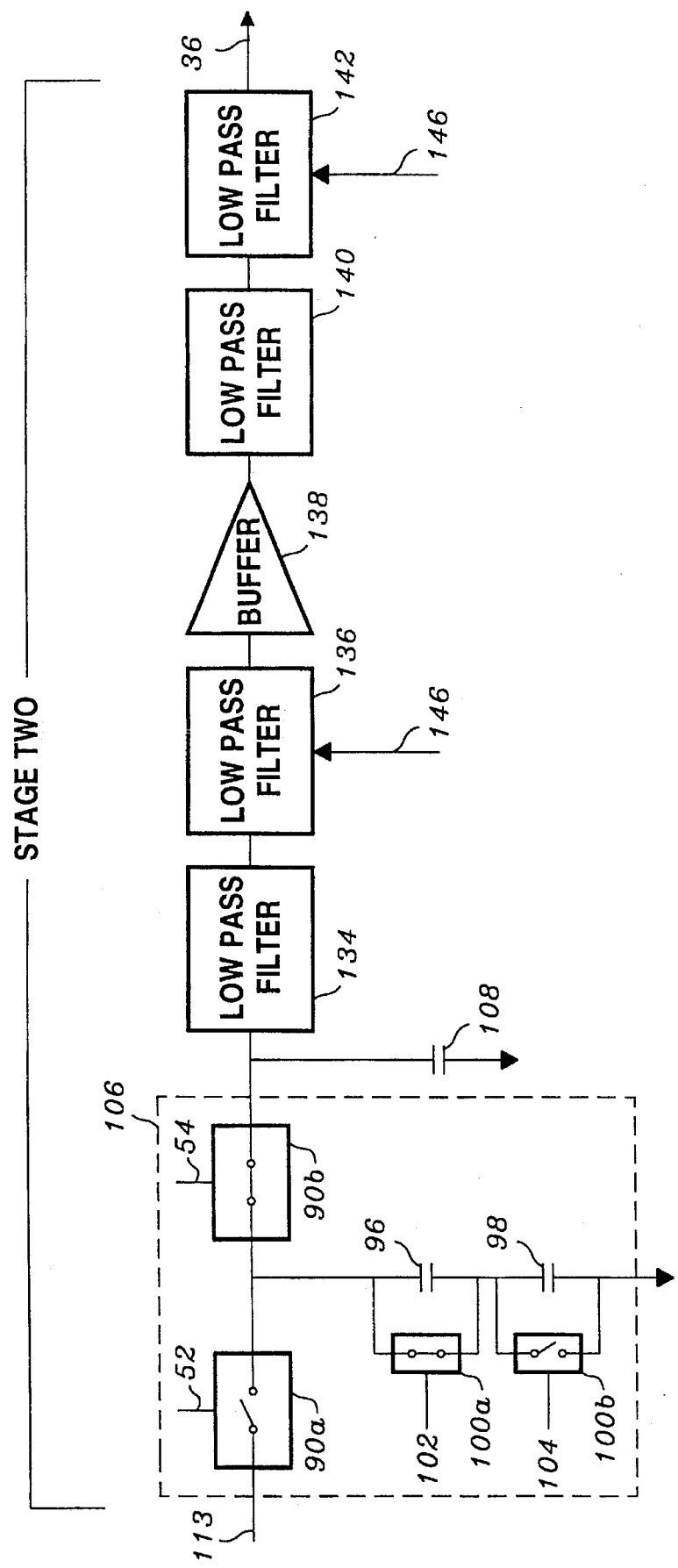
FIG. 9 is a circuit diagram depicting the electrical components used in the second stage of the low pass filter.

FIGS. 8 and 9 illustrate the components of low pass filter 34. Low pass filter 34 consists of two switched capacitor networks. The first network or stage one is depicted in FIG. 8 and the second network or stage is depicted in FIG. 9. Each stage produces a first order low pass rolloff with the combined stages resulting in an approximate second order filter response.

Referring to FIG. 8, stage one consists of two low pass filters cascaded to a buffer amplifier 112. The first low pass filter consists of a switched capacitor network 106 being utilized as an equivalent resistor and coupled to capacitor 108. The purpose of this filter is to shift out low frequency signals as defined by the corner frequency. Preferably, the corner frequency range can be between 10 Hz through 3 kHz. The second low pass filter 110 is a standard RC low pass filter used to filter out noise components contained in the signal at frequencies greater than the flow range. Preferably, this can be set to 3k Hz. These noise components can be attributable to clock pulse signals 52, 54 which are used to control the switched capacitor network.

Due to the large range of the corner frequencies, the range can be divided into two subranges: a first subrange spanning from 10 Hz to 400 Hz; and a second subrange spanning from 400 Hz to 3 kHz. Capacitor 98 is utilized to set a high corner frequency contained within the first range and capacitor 96 is used to set a high corner frequency contained within the second range. Capacitor 98 can be preferably 150 pF and capacitor 96 can be preferably 1200 pF. The use of the specific capacitor and ultimately the high corner frequency range can be chosen from the switches controlling the respective capacitor. Switch 100a controls the selection of capacitor 96 and switch 100b controls the selection of capacitor 98. Switches 100a, 100b are controlled through signals 102 and 104 respectively which emanate from micro-controller 22.

Switches 90a and 90b control the charging and discharging of capacitors 96 or 98. These switches are under the control of signals 52 and 54 which are 180 degrees out of phase with each other. The frequency of the switching as indicated by signals 52 and 54, and the size of the capacitor chosen 96 or 98 determines an equivalent resistance. This equivalence resistance is coupled with capacitor 108. Preferably, capacitor 108 can be 0.15 uf. The combination of the switched capacitor network 106 with capacitor 108 serves to define the high corner frequency of the low pass filter thereby providing a first order filter response.

FIG. 9 illustrates the components of the second stage of the low pass filter. Referring to FIG. 9, the second stage consists of a switched capacitor network coupled to low pass filter 134 connected to an optional low pass filter 146 followed by buffer stage 138. An additional low pass filter 140 is cascaded to the output of buffer stage 138 and coupled to an optional low pass filter 142. The low pass filters and buffer stages are conventional circuit elements.

Switched capacitor network 106 and capacitor 108 are identical to the same elements used in the first stage. Low pass filters 134 and 140 are identical filters which serve to filter out high frequency noise signals emanating from clock pulse signals 52, 54. Preferably, the high frequency corner setting is set at 3 k Hz. Low pass filters 136 and 142 are identical filters which serve to filter out low frequency noise components attributable to low flow rates. As this condition does not occur regularly, filters 136 and 140 are optional and are set when this event occurs. Signal 146 controls when these filters are activated and it is under the control of micro-controller 22.

The output of the low pass filter is filtered signal 36 which is then transmitted to square wave generator 38 for additional signal processing.

In summary, a method and apparatus for providing a micro-power adaptive filtering technique suitable for a variable frequency analog vortex sensor signal has been disclosed.

The apparatus of the invention comprises an analog signal conditioner and micro-controller for determining the flow rate of a process from a vortex signal generated from a vortex sensor. The vortex sensor signal is filtered by a bandpass filter to eliminate frequency signals attributable to acoustic, electrical, and mechanical vibrations existing in the ambient surroundings in flow measuring environments. The bandpass filter is a cascaded low pass and high pass filter whose corner frequencies are under the control of the micro-controller. The settings of these corner frequencies is based on the measured vortex frequency of the vortex sensor signal and altered to preserve a specified bandwidth about the vortex frequency thereby preserving a high signal-to-noise ratio which in effect produces a more accurate flow measurement for a wider flow range under adverse flow conditions. The filtered signal is then transmitted to a square wave generator producing an equivalent digital square wave pulse train for use in computing the measured vortex frequency.

The method of the invention is designed to preserve the specified bandwidth about the measured vortex frequency.

As the vortex frequency changes, the corner frequencies of the filters are dynamically adjusted to track the vortex frequency signal accordingly. However, for large changes in the vortex frequency, the corner frequencies are reinitialized and a new search for the vortex signal is made, thereby avoiding locking onto an erroneous noise signal. Furthermore, the method compensates the vortex sensor signal for added or missed vortex pulses thereby producing a more accurate measurement of the vortex frequency.

The electronic circuitry implementing the invention is designed to consist of low-cost components and to consume low power being in the order of less than 10 mW. Both of these considerations are essential for industrial instrumentation.

Although the preferred embodiment of the invention has been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. A method for processing vortex generated signal pulses representing the shedding frequency of alternating differential pressure vortices of a process flow, said method comprising:

a) determining an operating range, the operating range representing a range of vortex shedding frequencies of the process flow, said operating range bounded by a first frequency limit and a second frequency limit;

b) receiving the vortex generated signal;

c) filtering the vortex generated signal relative to a bandwidth, the bandwidth representing a range of vortex shedding frequencies within the operating range which will be preserved, said filtering attenuating a range of vortex shedding frequencies outside of the bandwidth;

d) computing the vortex shedding frequency of the vortex generated signal and generating a vortex frequency signal representative thereof;

e) checking for a rapid change within the vortex frequency signal and altering said filtering step to widen the bandwidth to at least one of said first frequency limit and said second frequency limit if the rapid change is detected;

f) adjusting said filtering step to preserve the bandwidth about the vortex frequency signal; and g) transmitting the vortex frequency signal to further signal processing circuitry for outputting the vortex frequency signal in a desired manner.

2. A method as in claim 1 wherein said filtering step utilizes an electronic filter selected from the group consisting of a bandpass filter, a high pass filter, and a low pass filter.

3. A method as in claim 1 wherein the bandwidth of said filtering step comprises a low portion and a high portion, the low portion representing a range of frequencies less than the vortex frequency signal, and the high portion representing a range of frequencies greater than the vortex frequency signal.

4. A method as in claim 3 wherein the low portion of the bandwidth is at least 0.5 times the vortex frequency signal and the high frequency band is set to at least 3 times the vortex frequency signal.

5. A method as in claim 1 wherein the step of computing the frequency of the vortex generated signal further comprises compensating the vortex frequency signal for added and dropped signal pulses.

6. A method as in claim 1 wherein the step of computing the frequency of the vortex generated signal further comprises the steps of:

a) sampling a portion of the vortex generated signal pulses over a sampling period;

b) determining a number of added vortex signal pulses and a number of dropped vortex signal pulses contained within the portion of said sampling step; and c) computing the vortex frequency as a function of the sampled portion and the number of added and dropped vortex signal pulses.

7. A method as in claim 6 wherein the step of determining a number of added and dropped vortex pulses further comprises the steps of:

a) computing an average period of the sampled portion of the vortex generated signal;

b) collecting a set of at least four consecutive previously computed average periods;

c) determining a median period from the set of said collecting step and the average period; and d) determining the number of dropped and added signal pulses as a function of the median and average period.

8. A method as in claim 6 wherein the step of determining added and missed vortex pulses further comprises the steps of:

a) computing an average value of the frequency of the sampled portion of the vortex generated signal;

b) collecting a set of at least four values of the frequencies of the four successive pulses of the sampled portion of the vortex generated signal;

c) determining a median frequency value from the set of said collecting step and the average value; and d) determining the number of dropped and added signal pulses as a function of the median and average frequency values.

9. A method as in claim 1 wherein said step of checking for a rapid change within the vortex frequency signal further comprises the steps of:

comparing the vortex frequency signal with a threshold dependent of a previous value of the vortex frequency signal, said comparison step producing a comparative measure signal; and determining whether the comparative measure signal satisfies a criteria thereby indicating whether or not a rapid change has occurred.

10. A method as in claim 1 wherein said filtering step utilizes a bandpass filter comprising a high pass and low pass filter, the high pass filter having an adjustable corner frequency and the low pass filter having an adjustable corner frequency;

wherein the bandwidth of said filtering step has a low portion and a high portion, the low portion representing a range of vortex shedding frequencies less than the vortex frequency signal, and the high portion representing a range of vortex shedding frequencies greater than the vortex frequency signal;

wherein the operating range of said determining step further comprises a low frequency range, a high frequency range, a low frequency limit and a high frequency limit, the low frequency range representing a range of vortex shedding frequencies used to adjust the corner frequency of the high pass filter, the high frequency range representing a range of vortex shedding frequencies used to adjust the corner frequency of the low pass filter, the low frequency limit representing the minimum vortex shedding frequency within the operating range, and the high frequency limit representing the maximum vortex shedding frequency within the operating range;

wherein the step of computing the frequency of the vortex generated signal further comprises the steps of:
  sampling a portion of the vortex generated signal over a sampling period;
  determining a number of added vortex pulses and a number of dropped vortex pulses contained within the portion of said sampling step; and
  computing the vortex frequency as a function of the sampled portion and the number of added and dropped vortex pulses;

wherein said checking step further comprising the steps of:
  checking for rapid changes in the vortex frequency signal relative to the low frequency range and altering said filtering step to widen the low portion of the bandwidth to the low frequency limit if the rapid change is detected; and
  checking for rapid changes in the vortex frequency signal relative to the high frequency range and altering said filtering step to widen the high portion of the bandwidth to the high frequency limit.

11. A vortex flowmeter for determining the flow rate of a process flow comprising:
  a) means for generating a vortex signal representing a frequency of alternating differential pressure vortices of a process flow, said vortices generated by the vortex flowmeter;
  b) means for determining an operating range, the operating range representing a range of possible vortex frequencies of the process flow, said operating range bounded by a first frequency limit and a second frequency limit;
  c) means for filtering from the vortex signal a range of vortex frequencies outside of a variable bandwidth and preserving the range of vortex frequencies defined by the bandwidth;
  d) means for computing the frequency of the vortex signal in order to determine a process flow rate;
  e) means for detecting changes in the frequency of the vortex signal;
  f) means for altering said filtering means relative to said detection means in order to preserve variable bandwidth about the vortex frequency signal, thereby generating an improved vortex frequency signal and a more accurate measurement of the process flow rate; and
  g) means for checking for a rapid change within the vortex frequency signal and altering said means for filtering to widen the bandwidth to at least one of said first frequency limit and said second frequency limit of the operating range if the rapid change is detected.

12. A method for processing vortex generated signal pulses representing the shedding frequency of alternating differential pressure vortices of a process flow, said method comprising:
  a) determining an operating range, the operating range representing a range of vortex shedding frequencies of the process flow;
  b) receiving the vortex generated signal;
  c) filtering the vortex generated signal relative to a bandwidth, the bandwidth representing a range of vortex shedding frequencies within the operating range which will be preserved, said filtering attenuating a range of vortex shedding frequencies outside of the bandwidth;
  d) computing the vortex shedding frequency of the vortex generated signal and generating a vortex frequency signal representative thereof, said computing including:
    i) sampling a portion of the vortex generated signal pulses over a sampling period;
    ii) determining a number of added vortex signal pulses and a number of dropped vortex signal pulses contained within the portion of said sampling; and
    iii) computing the vortex frequency as a function of the sampled portion and the number of added and dropped vortex signal pulses;
  e) adjusting said filtering step to preserve the bandwidth about the vortex frequency signal; and
  f) transmitting the vortex frequency signal to further signal processing circuitry for outputting the vortex frequency signal in a desired manner.

13. A system for processing vortex generated signal pulses representing the shedding frequency of alternating differential pressure vortices of a process flow, said system comprising:
  a) means for determining an operating range, the operating range representing a range of vortex shedding frequencies of the process flow;
  b) means for receiving the vortex generated signal;
  c) means for filtering the vortex generated signal relative to a bandwidth, the bandwidth representing a range of vortex shedding frequencies within the operating range which will be preserved, said means for filtering attenuating a range of vortex shedding frequencies outside of the bandwidth;
  d) means for computing the vortex shedding frequency of the vortex generated signal and generating a vortex frequency signal representative thereof, said means for computing including:
    i) means for sampling a portion of the vortex generated signal pulses over a sampling period;
    ii) means for determining a number of added vortex signal pulses and a number of dropped vortex signal pulses contained within the portion of said sampling; and
    iii) means for computing the vortex frequency as a function of the sampled portion and the number of added and dropped vortex signal pulses;
  e) means for adjusting said filtering step to preserve the bandwidth about the vortex frequency signal; and
  f) means for transmitting the vortex frequency signal to further signal processing circuitry for outputting the vortex frequency signal in a desired manner.

* * * * *